United States Patent [19]

Lee

[11] Patent Number: 5,535,195
[45] Date of Patent: Jul. 9, 1996

[54] METHOD FOR EFFICIENT AGGREGATION OF LINK METRICS

[75] Inventor: Whay C. Lee, Cambridge, Mass.

[73] Assignee: Motorola, Inc., Schaumburg, Ill.

[21] Appl. No.: 239,178

[22] Filed: May 6, 1994

[51] Int. Cl.$^6$ ............................................. H04L 12/56
[52] U.S. Cl. .............................. 370/54; 370/60; 370/94.3
[58] Field of Search ........................... 370/13, 14, 17, 370/54, 58.2, 58.3, 60, 68.1, 85.13, 94.1, 94.3; 340/825.03, 826; 395/325

[56] References Cited

U.S. PATENT DOCUMENTS

| | | | |
|---|---|---|---|
| 4,873,517 | 10/1989 | Baratz et al. | 370/54 |
| 5,042,027 | 8/1991 | Takase et al. | 370/54 |
| 5,079,767 | 1/1992 | Perlman | 370/94.3 |
| 5,234,592 | 9/1993 | Perlman et al. | 370/94.3 |

OTHER PUBLICATIONS

"Data Structures and Network Algorithms", Robert Endre Tarjan, Society for Industrial and Applied Mathematics, Philadelphia, PA. 1983 PP. 71–96.
"Automatic Update of Replicated Topology Databases", J. M. Jaffee & A. Segall, IEEE Transactions on Communications, vol. Com–33, No. 10, Oct. 1985 pp. 1076–1084.
"Metrics for Representing Internal Topology of a Logical Group Node", Munich, May 10–13, 1994 3 pages.
"A Strawman Proposal for the ATM PNNI Routing Hierarchy", Lake Tahoe, Jan. 17–20, 1994 15 pages.
"Establishing Virtual Circuits in Large Computer Networks", A. E. Baratz & J. M. Jaffe, Elsevier Science Publishers B.V., 1986 pp. 27–37.
"Routing to Multiple Destinations in Computer Networks", Kadaba Bharath–Kumar & J. M. Jaffe, IEEE Transactions on Communications, vol. Com–31, No. 3, Mar. 1983—pp. 333–351.
"A Comparison Between Two Routing Protocols: OSPF and IS–IS", R. Perlman, IEEE Network Magazine, Sep. 1991 pp. 18–24.
"Interconnections: Bridges and Routers", Radia Perlman, Addison–Wesley Publishing Company, Inc. 1992 pp. 265–306.

*Primary Examiner*—Benedict V. Safourek
*Attorney, Agent, or Firm*—Darleen J. Stockley

[57] ABSTRACT

The method of the present invention provides efficient aggregation of link metrics for a subnetwork in a communication network having a plurality of interconnected subnetworks that consist of nodes and links. The method includes: selecting, by a predetermined subnetwork leader, a subset of nodes in the subnetwork to be exposed nodes; for each link metric, generating, by the subnetwork leader, a spanning tree virtual topology connecting the exposed nodes; and assigning link metric values to the virtual links on the spanning tree and advertising the metric values in a topology broadcast by the subnetwork leader.

18 Claims, 6 Drawing Sheets

100

200

300

700

800

900

```
┌─────────────────────────────────────────────────────────────────┐
│  SELECTING A SUBSET OF THE NODES IN A SUBNETWORK OF THE         │─ 1302
│       COMMUNICATION NETWORK TO BE EXPOSED NODES.                │
└─────────────────────────────────────────────────────────────────┘
                               │
                               ▼
┌─────────────────────────────────────────────────────────────────┐
│ REDUCING THE ORIGINAL SUBNETWORK TOPOLOGY TO A FULL-MESH VIRTUAL│
│ TOPOLOGY CONNECTING THE EXPOSED NODES, SUCH THAT EACH VIRTUAL LINK│
│ CONNECTING A PAIR OF EXPOSED NODES ON THE FULL-MESH VIRTUAL     │
│ TOPOLOGY IS DERIVED UTILIZING AT LEAST ONE OF A-B:              │─ 1304
│ A) DETERMINING A MAXIMUM BANDWIDTH PATH IN THE ORIGINAL SUBNETWORK│
│    TOPOLOGY AND REPRESENTING EACH MAXIMUM BANDWIDTH PATH BY A VIRTUAL LINK│
│    WHOSE LINK METRIC VALUES EQUAL RESPECTIVE METRIC VALUES OF THE MAXIMUM│
│    BANDWIDTH PATH, AND WHEREIN A COLLECTION OF ALL VIRTUAL LINKS│
│    CONSTITUTES THE FULL-MESH TOPOLOGY;                          │
│ B) DETERMINING A MINIMUM DELAY PATH IN THE ORIGINAL SUBNETWORK TOPOLOGY│
│    AND REPRESENTING EACH MINIMUM DELAY PATH BY A VIRTUAL LINK WHOSE LINK│
│    METRIC VALUES EQUAL RESPECTIVE METRIC VALUES OF THE MINIMUM DELAY PATH,│
│    AND WHEREIN A COLLECTION OF ALL VIRTUAL LINKS CONSTITUTE THE │
│    FULL-MESH TOPOLOGY;                                          │
└─────────────────────────────────────────────────────────────────┘
                               │
                               ▼
┌─────────────────────────────────────────────────────────────────┐
│ WHERE THE FULL-MESH VIRTUAL TOPOLOGY IS DETERMINED WITH THE MAXIMUM│
│ BANDWIDTH OBJECTIVE,                                            │
│ C) DETERMINING THE SPANNING TREE FOR ENCODING AND ADVERTISING THE│
│    BANDWIDTH METRICS BY MEANS OF:                               │─ 1306
│ C1) DETERMINING, FROM THE FULL-MESH TOPOLOGY, A MAXIMUM BANDWIDTH│
│     SPANNING TREE USING A MAXIMUM SPANNING TREE ALGORITHM AND BANDWIDTH│
│     AS A LINK WEIGHTS; AND                                      │
│ C2) DISTRIBUTING THE BANDWIDTH OF THE VIRTUAL LINKS IN THE MAXIMUM│
│     BANDWIDTH SPANNING TREE TO THE EXTERNAL NODES IN THE NETWORK;│
│ D) DETERMINING THE SPANNING TREE FOR ENCODING AND ADVERTISING THE│
│    DELAY METRICS BY MEANS OF:                                   │
│ D1) DETERMINING, FROM THE FULL-MESH TOPOLOGY, A MAXIMUM DELAY SPANNING│
│     TREE USING A MAXIMUM SPANNING TREE ALGORITHM AND DELAY AS LINK WEIGHTS; AND│
│ D2) DISTRIBUTING THE DELAY OF THE VIRTUAL LINKS IN THE MAXIMUM  │
│     DELAY SPANNING TREE TO THE EXTERNAL NODES IN THE NETWORK;   │
└─────────────────────────────────────────────────────────────────┘
                               │
                               ▼
┌─────────────────────────────────────────────────────────────────┐
│ WHERE THE FULL-MESH VIRTUAL TOPOLOGY IS DETERMINED WITH THE MINIMUM│
│ DELAY OBJECTIVE,                                                │
│ E) DETERMINING THE SPANNING TREE FOR ENCODING AND ADVERTISING THE│─ 1308
│    BANDWIDTH METRICS BY MEANS OF:                               │
│ E1) DETERMINING, FROM THE FULL-MESH TOPOLOGY, A MINIMUM BANDWIDTH│
│     SPANNING TREE USING A MINIMUM SPANNING TREE ALGORITHM AND BANDWIDTH│
│     AS A LINK WEIGHTS; AND                                      │
│ E2) DISTRIBUTING THE BANDWIDTH OF THE VIRTUAL LINKS IN THE MINIMUM│
│     BANDWIDTH SPANNING TREE TO THE EXTERNAL NODES IN THE NETWORK;│
│ F) DETERMINING THE SPANNING TREE FOR ENCODING AND ADVERTISING THE│
│    DELAY METRICS BY MEANS OF:                                   │
│ F1) DETERMINING, FROM THE FULL-MESH TOPOLOGY, A MAXIMUM DELAY SPANNING│
│     TREE USING A MAXIMUM SPANNING TREE ALGORITHM AND DELAY AS LINK WEIGHTS; AND│
│ F2) DISTRIBUTING THE BANDWIDTH OF THE VIRTUAL LINKS IN THE MAXIMUM│
│     DELAY SPANNING TREE TO THE EXTERNAL NODES IN THE NETWORK    │
└─────────────────────────────────────────────────────────────────┘
```

*FIG. 13*     1300

METHOD FOR EFFICIENT AGGREGATION OF LINK METRICS

FIELD OF THE INVENTION

This invention relates generally to link state parameters in a communication network, and more particularly to efficient aggregation of link states for a subnetwork in a communication network.

BACKGROUND

In a communication network consisting of nodes representing switching systems and links representing transmission facilities between pairs of nodes, the network topology, i.e., the collection of all link state information, is maintained by each node that is responsible for path computation for establishing communication between nodes. Routing protocols, which are used to select paths, may be broadly divided into two classes: link state protocols and distance vector protocols. Link state protocols require each node to maintain the states of all relevant links. Distance vector protocols require each node to maintain the state of the shortest path from itself to each relevant destination.

Link metrics are quantitative link state parameters that are associated with the quality of information transfer and are used in path computation. There are two kinds of link metrics: non-additive and additive link metrics. A non-additive link metric generically takes the form of "bandwidth". An additive link metric generically takes the form of "delay". The generic path selection problem is to determine a path according to a given routing objective, such that the bandwidth of each link on the selected path is greater than a given bandwidth threshold, and that the delay along the selected path is smaller than a given delay threshold. There are two common routing objectives in the prior art: maximum bandwidth and minimum delay.

Path metrics are derived from link metrics. For a non-additive link metric such as bandwidth, the metric value associated with a path is the minimum metric value among all the links along the path. For an additive link metric such as delay, the metric value associated with a path is the sum of the metric values of the links along the path.

The topology of the network is kept in a topology database attached to each node that is responsible for maintaining and using such information. Due to changes in the network, the topology must be updated from time to time via a topology broadcast mechanism. A topology broadcast is an event executed by a node such that a message containing link state information is advertised or distributed to all other nodes in the network.

There are two general approaches in the prior art to address topology update complexity. In one approach, the prior art reduces complexity by limiting the handling of the topology to a subset of the nodes in the network. In another approach, the prior art aggregates the link states in each subnetwork so that nodes outside the subnetwork need only maintain partial information on its topology. Typically, a representative node is elected from the nodes in the subnetwork to be responsible for aggregating and advertising the subnetwork link metrics to nodes outside the subnetwork.

The prior art that makes no compromise in the amount of link state information divides all nodes into two types: (i) master nodes with extended memory and computing capabilities, and (ii) subordinate nodes with limited memory and computing capabilities. A topology database is attached to each master node and is used by the node for path computation. The subordinate nodes rely on the master nodes for topology maintenance and path computation.

In an extreme approach for link metric aggregation, the entire subnetwork is represented by a pseudonode. Such an approach can be traced back to the IS-IS, i.e.., Intermediate System-to-Intermediate System, routing protocol. In one version of this approach, all internal link metrics of the subnetwork are reduced to a node metric for the pseudonode by taking worst cases. For an additive link metric, a popular assignment of the corresponding node metric is the "diameter" or the length of the longest shortest path between any pair of nodes in the subnetwork. For a non-additive link metric, a popular assignment of the corresponding node metric is the bandwidth of the smallest maximum-bandwidth path between any pair of nodes in the subnetwork. Another version of the approach is to let the pseudonode to represent the "middle" of the subnetwork, and assign an appropriate metric, by taking averages, to each of the links connecting the psuedonode and the exposed nodes. A variation of the above versions makes use of a diameter variance metric in addition to the diameter metric to reflect deviation from a symmetric topology.

In the OSPF, i.e., the Open Shortest Path First, routing protocol, summary link states are used for intersubnetwork routing. The summary links are essentially virtual links to external nodes. From the point of view of a subnetwork, there are internal links that connect the internal nodes together, and there are summary links that emanate from the subnetwork to external nodes. OSPF is designed to be a link state routing protocol.

In the prior art, a network is clustered into a number of levels, and each node has knowledge of only the shortest paths within its own lowest level cluster and a single shortest path to each supercluster. Path selection is based on a distance-vector method, where a routing table indicating the best next hop for each intended destination is maintained by each node.

Also in the prior art that aggregates link states, the original topology of the subnetwork is reduced to a smaller topology consisting of a subset of the nodes, namely exposed nodes, in the subnetwork. This method advertises a full-mesh virtual topology whose nodes are the exposed nodes and whose links represent paths in the original topology. The paths are determined with respect to a given routing objective. The links in the virtual topology are known as virtual links. This approach is well suited to a hierarchical routing architecture.

In other prior art, a different problem is solved. A heuristic that starts by computing a full-mesh shortest-path network consisting of a subset of the nodes in a given original network and then reducing the full-mesh network to a minimum spanning tree is used for routing to multiple destinations in a computer network, where the object is to minimize the total link weight on the multicast tree that connects the destination nodes together. There are two common spanning tree algorithms known in the prior art: maximum spanning tree algorithm and minimum spanning tree algorithm.

Although the approaches that advertise the topology in terms of a pseudonode, i.e., variations of the approach in IS-IS, offer the greatest reduction of advertised information, these approaches typically do not supply enough information for efficient routing. Moreover, the version that handles worst cases cannot reflect the link state information associated with an asymmetric subnetwork topology. The version that takes averages cannot offer any performance guarantee. The version that uses a diameter variance metric is still under investigation. When a subset of the nodes in the subnetwork are exposed, all versions do not apply.

The approach that advertises the full-mesh representation of the subnetwork requires advertisement of order $M^2$ pieces of link state information when the number of exposed nodes is M. For a subnetwork whose nodes are not very densely connected, the amount of link state information to be advertised may well exceed that contained in the original topology of the subnetwork when M is sufficiently large. Such explosion of link state information contradicts the purpose of link metric aggregation, i.e., efficiency in routing.

The summary link approach in OSPF does not capture enough link state information for efficient routing that is subject to quality of service constraints. Specifically, it does not offer the flexibility to pick and choose link resources that best meet the quality of service requirements for a connection.

Efficient aggregation of link metrics should provide more efficient routing through the communication network. Hence, there is a need for a method for efficient aggregation of link metrics such that the number of link metrics to be advertised is minimized without appreciably compromising the information contained in the link metrics.

BRIEF DESCRIPTION OF THE DRAWINGS

FIG. 13 is a flow chart of an embodiment of steps in accordance with the method of the present invention.

DETAILED DESCRIPTION OF A PREFERRED EMBODIMENT

In a large internetworking environment consisting of many subnetworks, aggregation of link metrics would be advantageous, in particular for two reasons. First, the amount of link state information must be compressed to reduce the topology update complexity which is proportional to the number of links. Second, the actual topology of a subnetwork may have to be hidden for security reasons. The method of the present invention is applicable to link state routing protocols, and provides an efficient solution to the problem of aggregating link states, specifically link metrics, within a subnetwork where a predetermined subset of the nodes are exposed, i.e., to be retained in the process of aggregation. This method requires significantly less communication bandwidth for topology updates than the conventional method where every node in the network is involved in maintaining and updating the entire topology of the network. The method of the present invention may also be applied recursively to a network with hierarchical structures.

The purpose of link metric aggregation is to represent the original topology in the subnetwork by a virtual topology that consists of only the exposed nodes and the smallest number of virtual links that can adequately capture the internal link metrics of the subnetwork for the purpose of path selection based on a given routing objective. There may be one such virtual topology for each link metric. The virtual topologies do not have to be the same since only the link metric information derived from them is of importance.

Figure 1:
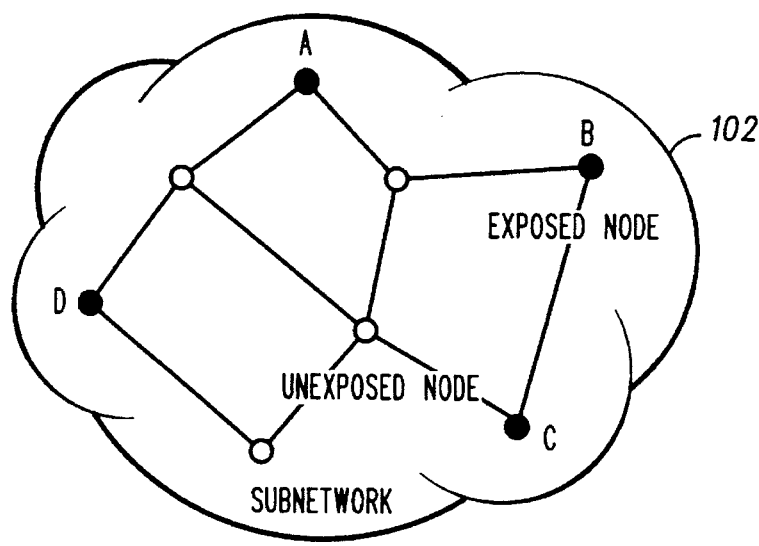
FIG. 1 is a representation of a topology of a subnetwork for utilizing the method of the present invention.
Figure 2:
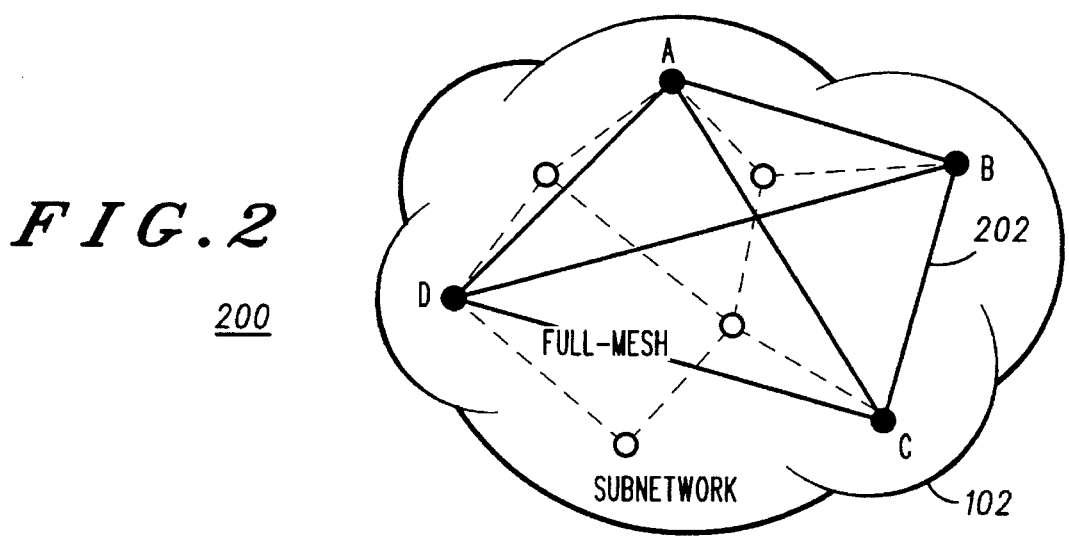
FIG. 2 is a representation of a full-mesh topology of a subnetwork for utilizing the method of the present invention.
Figure 3:
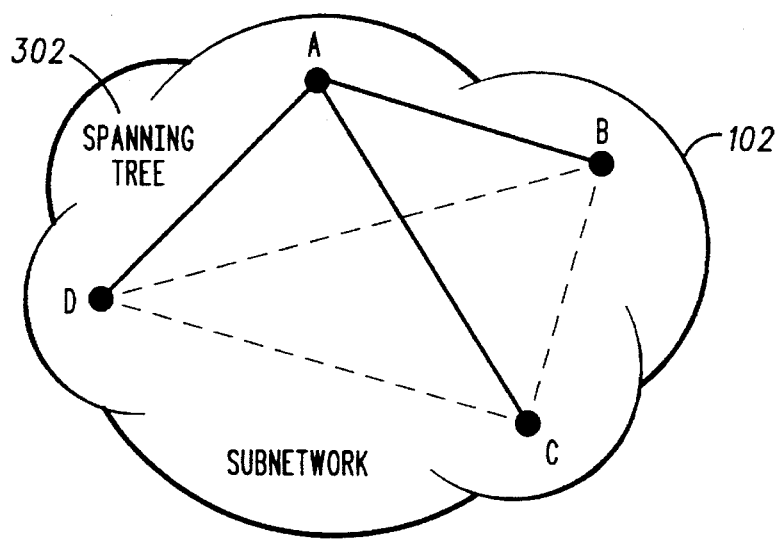
FIG. 3 is a representation of a spanning tree topology of a subnetwork for utilizing the method of the present invention.

For example, consider aggregating link metrics for a subnetwork with N connected nodes, M of which are exposed, or retained in the aggregation, where M<N, where M and N are positive integers. FIG. 1, numeral 100, shows an exemplary subnetwork (102) whose exposed nodes (A, B, C, D) are shaded. For M exposed nodes, the largest number of virtual links that connect them together, since no parallel links are allowed, is $M(M-1)/2$, i.e., order $M^2$, and such a fully connected topology, FIG. 2, numeral 200, is known as a full-mesh topology (fully interconnected A-B-C-D; 202). The smallest number of virtual links that connect all the exposed nodes together is (M−1), and any connected virtual topology with (M−1) virtual links belongs to the family of topologies known as "trees". Specifically, since all M exposed nodes are on the tree in this case, the tree, shown in FIG. 3, numeral 300, is known as a "spanning tree". A tree topology consists of no loops. Also, there is a unique path connecting each pair of nodes on the spanning tree.

Where topology update complexity is not an issue, one would clearly want to advertise all the link metric information contained in the full-mesh virtual topology, thereby obtaining the best, i.e., most complete, network topology without permitting parallel links. The representation of the original subnetwork topology by a full-mesh topology connecting a predetermined set of exposed nodes is referred to as a complete summarization of the subnetwork topology. Where selected, the information contained in the complete summarization is compressed by means of encoding. The method of the present invention encodes the link metric information contained in the full-mesh topology, together with minimum compromise in the capability to recover it. The order $M^2$ pieces of link metric information are compressed to order M pieces. Given this encoded link metric information, one can obtain (M–1) pieces of the link metric information with complete accuracy and derive reasonable estimates of the remaining pieces in the form of lower bounds for bandwidth metrics and upper bounds for delay metrics. In some cases, the estimates are so accurate that they are equal to the exact metric values. In this way the number of link metrics to be advertised is minimized without appreciably compromising the information contained in the link metrics.

The aggregation and distribution of link metrics for a subnetwork are typically executed by a representative node elected from the nodes in the subnetwork. This node is referred to as the subnetwork leader. The link metric advertisement is to be received by nodes outside the subnetwork. These nodes are referred to as external nodes. Upon receiving the advertisement, each external node is responsible for decoding or estimating the values of the aggregated link metrics of the subnetwork.

Figure 10:
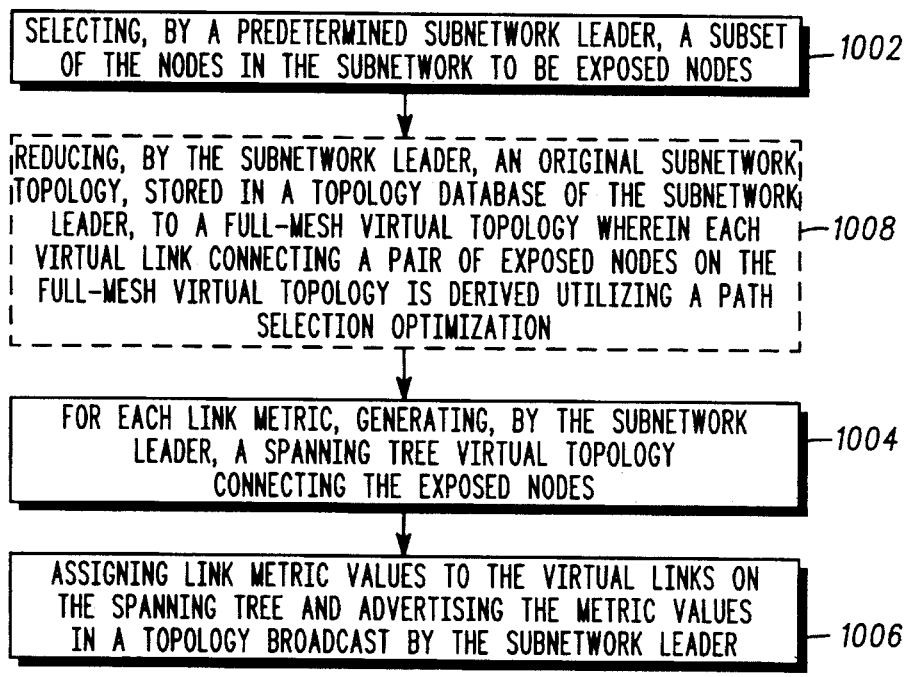
FIG. 10 is a flow chart of one embodiment of steps in accordance with the method of the present invention, which provides efficient aggregation of link metrics for a subnetwork in a communication network having a plurality of interconnected subnetworks that consist of nodes and links.

FIG. 10, numeral 1000, is a flow chart of one embodiment of steps in accordance with the method of the present invention, which provides efficient aggregation of link metrics for a subnetwork in a communication network, comprising the steps of: A) selecting, by a predetermined subnetwork leader, a subset of the nodes in the subnetwork to be exposed nodes (1002); B) for each link metric, generating, by the subnetwork leader, a spanning tree virtual topology connecting exposed nodes (1004); and C) assigning link metric values to the virtual links on the spanning tree and advertising the metric values in a topology broadcast by the subnetwork leader (1006). Where selected, one may add, after step (A) a step of reducing, by the subnetwork leader, an original subnetwork topology, stored in a topology database of the subnetwork leader, to a full-mesh virtual topology wherein each virtual link connecting a pair of exposed nodes on the full-mesh virtual topology is derived utilizing a path selection optimization (1008). The advertised link metric values in step (D) typically include a number of predetermined specific link metric values for replacing selected estimates derived from each spanning tree.

Thus, the original topology of the communication subnetwork is reduced by the subnetwork leader to a full-mesh virtual topology connecting a set of M predetermined exposed nodes, M a positive integer, such that the metric values on each virtual link on the full-mesh virtual topology are derived from a path selection optimization, e.g., a maximum bandwidth path or a minimum delay path. Then, for each link metric, the subnetwork leader generates a spanning tree virtual topology from the full-mesh virtual topology for encoding the metric values on the full-mesh topology. The subnetwork leader then advertises the encoded link metric values, i.e., those assigned to the virtual links on the spanning trees, to the external nodes via a topology broadcast. For each link metric, a full-mesh topology connecting the M exposed nodes is derived, by each external node, by means of a decoding technique, set forth below, from the spanning tree topology such that the link metric value associated with each virtual link on the derived full-mesh topology is an estimate of the link metric value associated with the corresponding virtual link in the original full-mesh representation of the subnetwork topology.

Although generally the link metric values associated with a link are substantially symmetrical in both directions of a link, the method of the present invention is also applicable where link metric values are not symmetrical. In the case of the generic link metrics bandwidth and delay, the link bandwidth may be taken to be the minimum bandwidth between the two directions, and the delay to be the maximum delay between the two directions. In the present invention, an estimate for bandwidth is a lower bound, and where it is a lower bound on the minimum bandwidth between the two directions of a link, the bandwidth estimation is the lower bound on bandwidth for both directions. In the present invention, an estimate for delay is an upper bound, and where it is an upper bound on the maximum delay between the two directions, the estimate for delay is the upper bound on delay for both directions.

The present invention provides for selectively utilizing, for example, one of two types of path selection optimization: bandwidth maximization and delay minimization. A path for the bandwidth maximization is determined utilizing a maximum bandwidth path algorithm. A path for the delay minimization is determined utilizing a minimum delay path algorithm. The maximum bandwidth path algorithm is a straightforward variation of the shortest path algorithm. The present invention also utilizes a graph algorithm, the Maximum Spanning Tree algorithm, and its equivalent version Minimum Spanning Tree. The Maximum/Minimum Spanning Tree algorithm is used to determine a spanning tree with the maximum/minimum sum of link weights.

The present invention combines the selected path optimization and spanning algorithms in a unique manner to provide a new, efficient method for aggregation of link metrics. The path for the delay minimization is determined utilizing a Minimum Delay Link Metric Aggregation Heuristic. Where path optimization is based on maximum bandwidth, the link metric aggregation algorithm in accordance with the present invention is referred to as the Maximum Bandwidth Link Metric Aggregation Heuristic. Where path optimization is based on minimum delay, the link metric aggregation algorithm in accordance with the present invention is referred to as the Minimum Bandwidth Link Metric Aggregation Heuristic.

Figure 11:
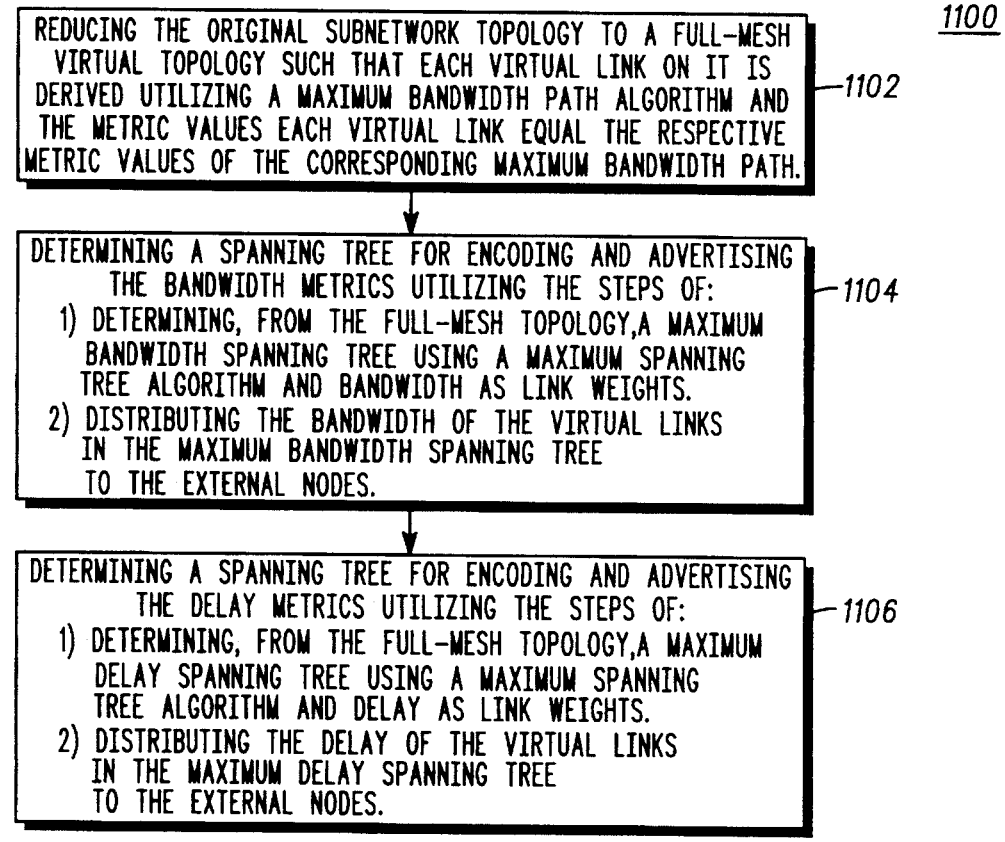
FIG. 11 is a flow chart of one embodiment of steps for aggregation of link metrics for bandwidth maximization utilizing the Maximum Bandwidth Link Metric Aggregation Heuristic in accordance with the method of the present invention.

Thus, where link metrics are aggregated for bandwidth maximization utilizing the Maximum Bandwidth Link Metric Aggregation Heuristic, the following steps, shown in the flow chart of FIG. 11, numeral 1100, of are utilized: A) determining a maximum bandwidth path for each pair of exposed nodes in the original subnetwork topology and representing each maximum bandwidth path by a virtual link whose link metric values equal respective metric values of the maximum bandwidth path and wherein a collection of all virtual links constitutes the full-mesh virtual topology (1102); B) determining, from the full-mesh topology, a Maximum Bandwidth Spanning Tree using a Maximum Spanning Tree algorithm and bandwidth as link weights and distributing the bandwidth of the virtual links in the resulting spanning tree to the external nodes in the network (1104); and C) determining, from the full-mesh topology, a Maximum Delay Spanning Tree using a Maximum Spanning Tree algorithm and delay as link weights and distributing the delay of the virtual links in the resulting spanning tree to the external nodes in the network (1106).

The delay associated with a maximum bandwidth path connecting a pair of exposed nodes is an upper bound on the minimum delay for any path connecting the same pair of exposed nodes because a path requiring less bandwidth than the maximum bandwidth may always have the maximum bandwidth path as an alternative.

The bandwidth of any virtual link not on the spanning tree is typically estimated by taking the minimum bandwidth among the virtual links along the unique path that forms a loop with the virtual link, i.e., the bandwidth of the path. The maximum bandwidth of the virtual link not on the spanning tree cannot be larger than the estimate, or the tree will not be a maximum bandwidth spanning tree. On the other hand, it cannot be smaller than the estimate, for there is a contradiction if there exists an alternate path with a larger bandwidth than the maximum bandwidth of the virtual link. Hence, the bandwidth of the unique path is indeed the same as the bandwidth of the maximum bandwidth path or the corresponding virtual link in the full-mesh topology. Where a Minimum Spanning Tree algorithm is utilized in the second step instead of a Maximum Spanning Tree algorithm, lower bound estimates are obtained by taking the maximum bandwidth among the virtual links along the unique path.

The delay of any virtual link not on the spanning tree is typically estimated by taking the minimum delay among the virtual links along the unique path that forms a loop with the virtual link, i.e., not the delay of the path since delay is an additive link metric. The delay of the virtual link not on the spanning tree cannot be larger than the estimate, or the tree is not a maximum delay spanning tree. Hence, the estimate serves as an upper bound on the delay of the maximum bandwidth path or the corresponding virtual link in the full-mesh virtual topology.

Figure 12:
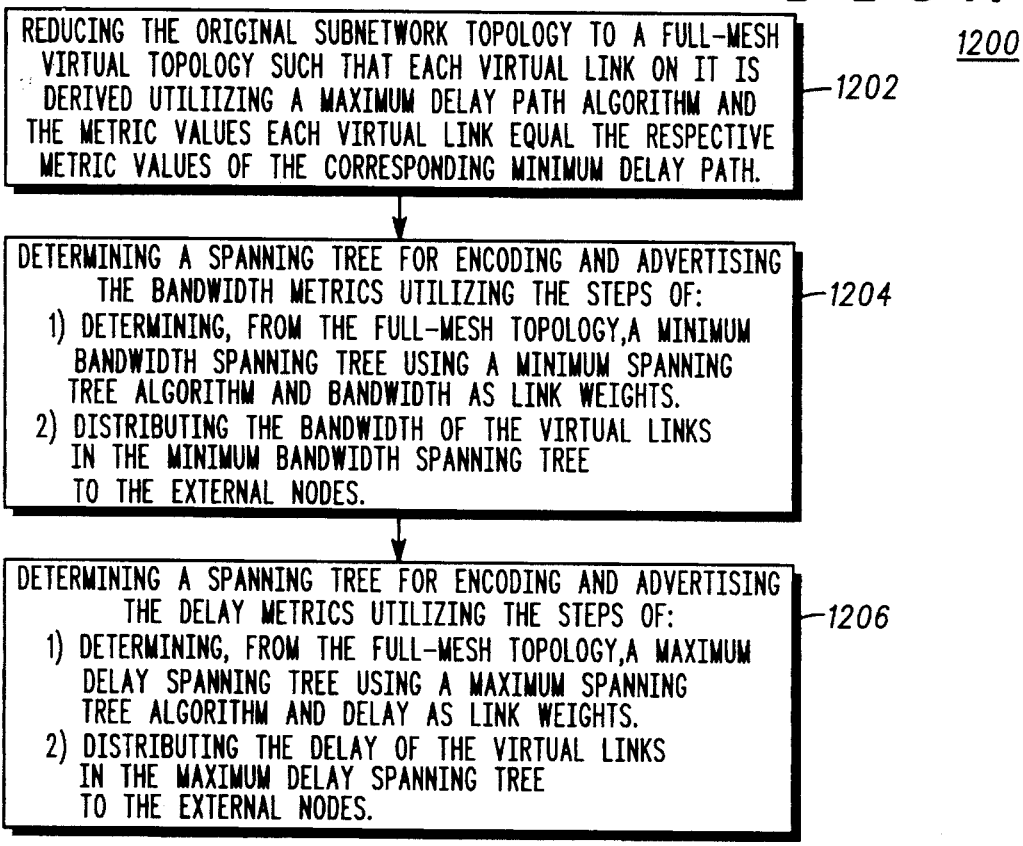
FIG. 12 is a flow chart of one embodiment of steps for aggregation of link metrics for delay minimization utilizing the Minimum Delay Link Metric Aggregation Heuristic in accordance with the method of the present invention.

Thus, as shown in FIG. 12, numeral 1200, where link metrics are aggregated for delay minimization utilizing the Minimum Delay Link Metric Aggregation Heuristic, the following steps are included: A) determining a minimum delay path for each pair of exposed nodes in the original subnetwork topology wherein each minimum delay path is represented by a virtual link whose link metric values are equal to the respective metric values of the minimum delay path and a collection of all the virtual links forms a full-mesh virtual topology (1202); B) determining, from the full-mesh topology, a Minimum Bandwidth Spanning Tree using a Minimum Spanning Tree algorithm and bandwidth as link weights and distributing the bandwidth of the virtual links in the resulting spanning tree to the external nodes in the network (1204); and C) determining, from the full-mesh topology, a Maximum Delay Spanning Tree using a Maximum Spanning Tree algorithm and delay as link weights and distributing the delay of the virtual links in the resulting spanning tree to the external nodes in the network (1206).

The bandwidth associated with a minimum delay path connecting a pair of exposed nodes is a lower bound on the maximum bandwidth for any path connecting the same pair of exposed nodes because a path that can tolerate a larger delay than the minimum delay always has the minimum delay path as an alternative.

The bandwidth of any virtual link not on the spanning tree is typically estimated by taking the maximum bandwidth among the virtual links along the unique path that forms a loop with the virtual link, i.e., not the bandwidth of the path. The maximum bandwidth of the virtual link not on the spanning tree cannot be smaller than the estimate, or the tree would not be a minimum bandwidth spanning tree. Hence, the estimate serves as a lower bound on the bandwidth of the minimum delay path or the corresponding virtual link in the full-mesh topology.

The delay of any virtual link that is not on the spanning tree may be estimated by taking the minimum delay among the virtual links along the unique path that forms a loop with the virtual link, i.e., not the delay of the path since delay is an additive link metric. The delay of the virtual link not on the spanning tree cannot be larger than the estimate, or the tree is not a maximum delay spanning tree. Hence, the estimate serves as an upper bound on the delay of the minimum delay path or the corresponding virtual link in the full-mesh topology.

In both cases, the bounds on the link metrics of the virtual links may be somewhat flexible. When a particular bound on a link metric is flexible, one can additionally advertise a specific virtual link to be used for replacing the estimate derived from the spanning tree. If additional metric values not associated with the spanning tree are advertised, it is important that they are indicated as such in the advertisement, so that the spanning tree can be identified for generating metric estimates.

Figure 4:
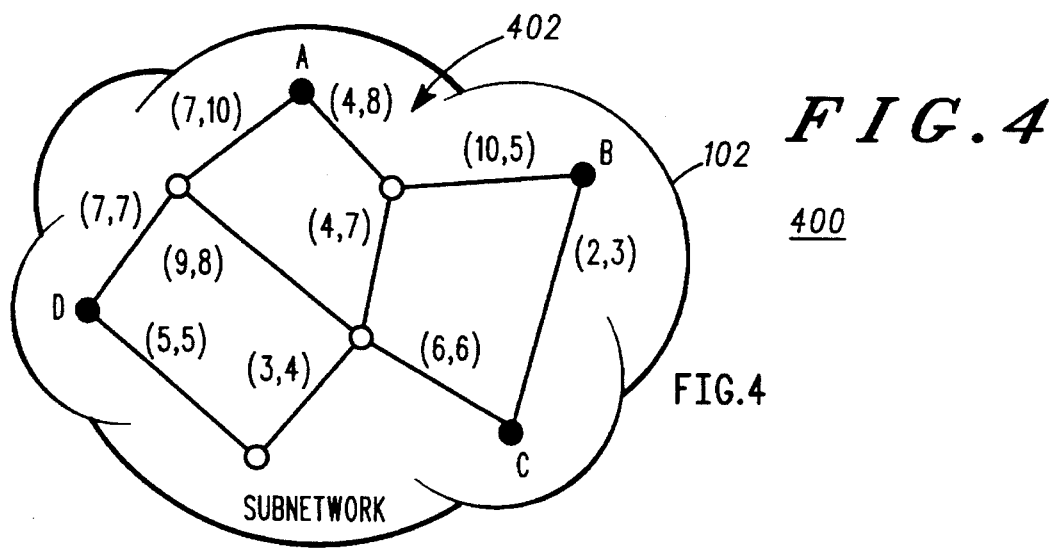
FIG. 4 is a representation of exemplary bandwidth and delay metrics in a subnetwork for utilizing the method of the present invention.
Figure 5:
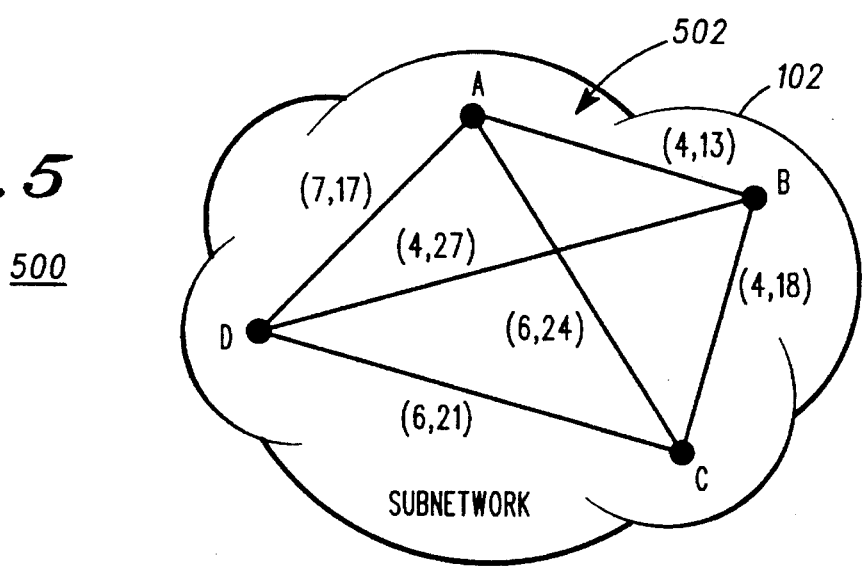
FIG. 5 is a representation of exemplary bandwidth and delay metrics for a full-mesh topology derived from maximum bandwidth paths utilizing the method of the present invention.
Figure 6:
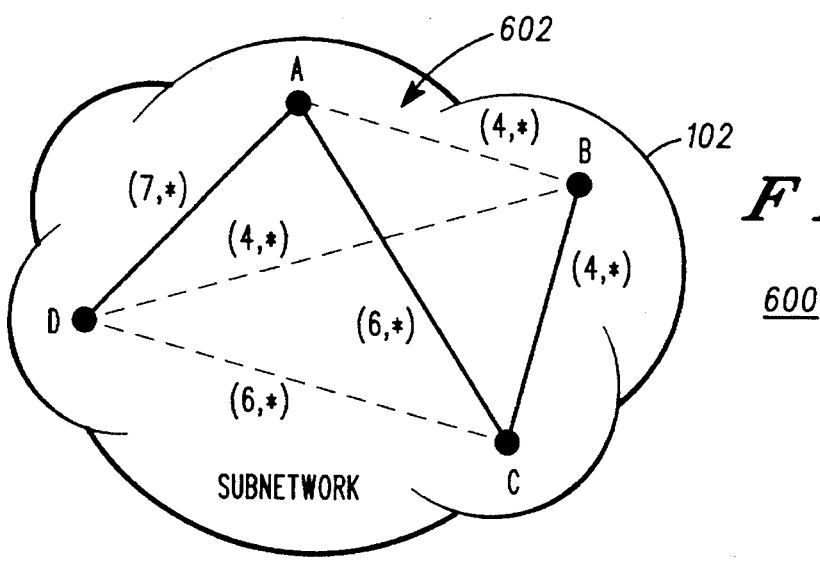
FIG. 6 is a representation of exemplary metrics for a maximum bandwidth spanning tree in accordance with the method of the present invention.
Figure 7:
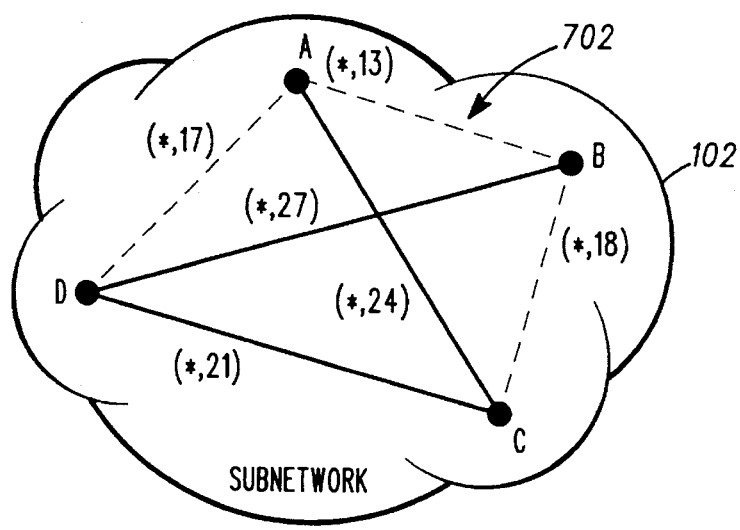
FIG. 7 is a representation of exemplary metrics for a maximum delay spanning tree in accordance with the method of the present invention.
Figure 8:
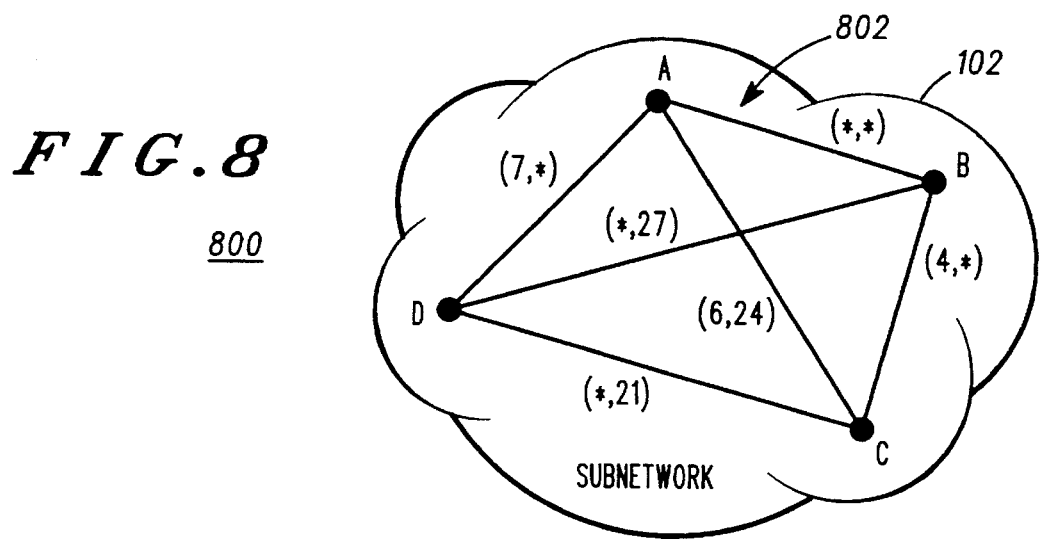
FIG. 8 is a representation of exemplary metrics advertised for bandwidth and delay in accordance with the method of the present invention.
Figure 9:
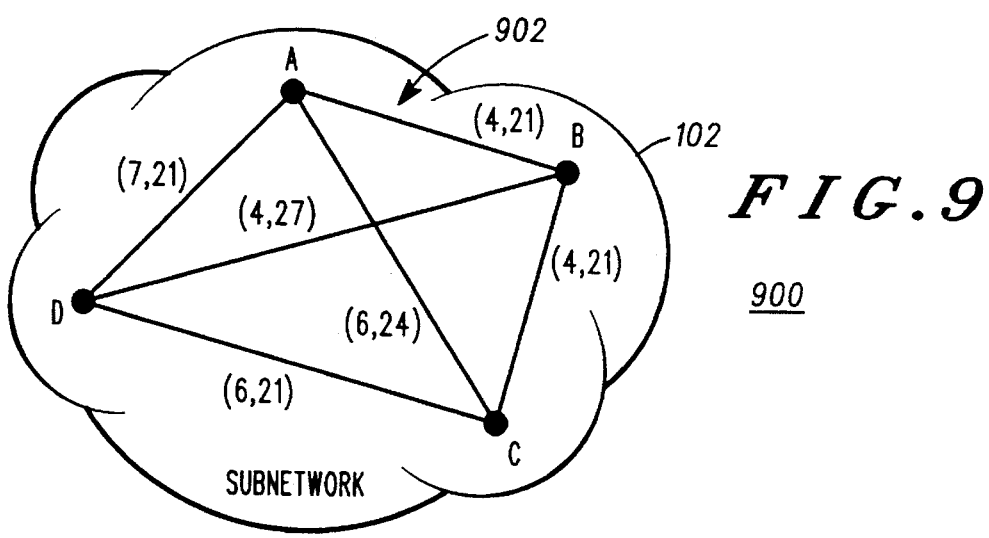
FIG. 9 is a representation of exemplary estimates for a full-mesh topology in accordance with the method of the present invention.

An example of the application of the invention using the Maximum Bandwidth Link Metric Aggregation Heuristic is shown in FIGS. 4–9, numerals 400, 500, 600, 700, 800 and 900 respectively. FIG. 4, numeral 400, is a representation of exemplary bandwidth and delay metrics (402) in a subnetwork for utilizing the method of the present invention. FIG. 5, numeral 500, is a representation of exemplary bandwidth and delay metrics (502) for a full-mesh topology derived from maximum bandwidth paths utilizing the method of the present invention. FIG. 6, numeral 600, is a representation of exemplary metrics (602) for a maximum bandwidth spanning tree in accordance with the method of the present invention. FIG. 7, numeral 700, is a representation of exemplary metrics (702) for a maximum delay spanning tree in accordance with the method of the present invention. FIG. 8, numeral 800, is a representation of exemplary metrics (802) advertised for bandwidth and delay in accordance with the method of the present invention. FIG. 9, numeral 900, is a representation of exemplary estimates (902) for a full-mesh topology in accordance with the method of the present invention.

In the FIGS. 4–9, link metric values associated with a link are represented by an ordered pair, (x, y), where x is the bandwidth value and y is the delay value, and wherever x or y is replaced by an "*", the corresponding link metric value is not relevant in the context of the figure. Exposed nodes A, B, C, and D are utilized to construct a full-mesh topology. In this example, the bandwidth values are accurately recovered as expected, and upper bounds on the delay values are obtained. Where the delay estimate for the virtual link AB differs considerably from the actual delay for the same virtual link, the delay value for that virtual link is typically additionally advertised together with an indication that it does not belong to the Maximum Delay Spanning Tree.

Thus, in one embodiment, shown in FIG. 13, numeral 1300, the method of the present invention for providing efficient aggregation of link metrics for a subnetwork in a communication network includes the steps of: A) selecting a subset of nodes in a subnetwork of the communication network (1302) to be exposed nodes; B) reducing the original subnetwork topology to a full-mesh virtual topology (1304) connecting the exposed nodes, such that each virtual link connecting a pair of exposed nodes on the full-mesh virtual topology is derived utilizing at least one of B1–B2: B1) determining a maximum bandwidth path in the original subnetwork topology and representing each maximum bandwidth path by a virtual link whose link metric values equal respective metric values of the maximum bandwidth path, and wherein a collection of all virtual links constitutes the full-mesh topology; B2) determining a minimum delay path in the original subnetwork topology and representing each minimum delay path by a virtual link whose link metric values equal respective metric values of the minimum delay path, and wherein a collection of all virtual links constitutes the full-mesh topology; C) where the full-mesh virtual topology is determined with the maximum bandwidth objective, C1) determining the spanning tree for encoding and advertising the bandwidth metrics (1306) by means of: C1a) determining, from the full-mesh topology, a Maximum Bandwidth Spanning Tree using a Maximum Spanning Tree algorithm and bandwidth as link weights; and C1b) distributing the bandwidth of the virtual links in the Maximum Bandwidth Spanning Tree to the external nodes in the network; C2) determining the spanning tree for encoding and advertising the delay metrics by means of: C2a) determining, from the full-mesh topology, a Maximum Delay Spanning Tree using a Maximum Spanning Tree algorithm and delay as link weights; and C2b) distributing the delay of the virtual links in the Maximum Delay Spanning Tree to the external nodes in the network; D) where the full-mesh virtual topology is determined with the minimum delay objective, D1) determining the spanning tree for encoding and advertising the bandwidth metrics (1308) by means of: D1a) determining, from the full-mesh topology, a Minimum Bandwidth Spanning Tree using a Minimum Spanning Tree algorithm and bandwidth as link weights; and D1b) distributing the bandwidth of the virtual links in the Minimum Bandwidth Spanning Tree to the external nodes in the network; D2) determining the spanning tree for encoding and advertising the delay metrics by means of: D2a) determining, from the full-mesh topology, a Maximum Delay Spanning Tree using a Maximum Spanning Tree algorithm and delay as link weights; D2b) distributing the bandwidth of the virtual links in the Maximum Delay Spanning Tree to the external nodes in the network.

Figure 14:
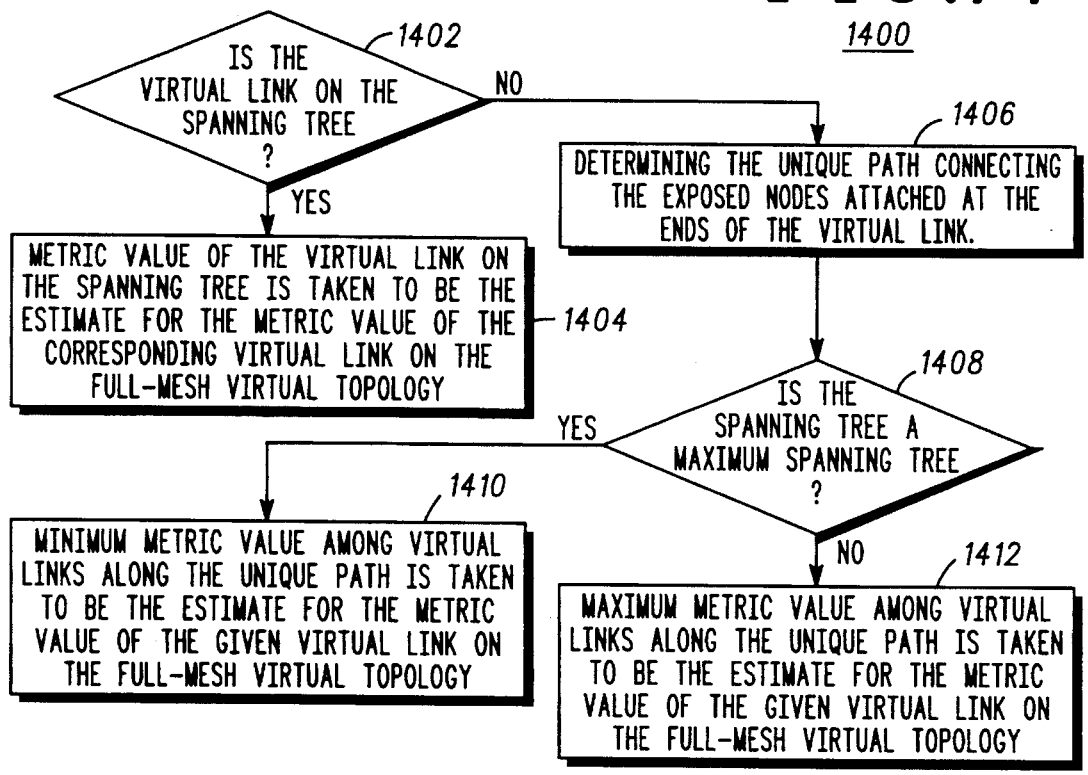
FIG. 14 is a flow chart of one embodiment of, in the step of assigning link metric values to the virtual links in accordance with the present invention, selecting a virtual link, on the full-mesh virtual topology, whose metric value is to be estimated from the corresponding spanning tree.

FIG. 14, numeral 1400, is a flow chart of one embodiment of, in the step of assigning link metric values to the virtual links in accordance with the present invention, selecting a virtual link, on the full-mesh virtual topology, whose metric value is to be estimated from the corresponding spanning tree, including the steps of: A)

determining whether the virtual link is on the spanning tree (1402); B) where the virtual link is on the spanning tree, a metric value of the virtual link on the spanning tree is taken to be an estimate for the metric value of the corresponding virtual link on the full-mesh topology (1404); C) where the virtual link is absent from the spanning tree, determining a unique path connecting the exposed nodes attached at ends of the virtual link (1406), and determining whether the spanning tree is a maximum spanning tree (1408); C1) where the spanning tree is a maximum spanning tree, taking a minimum metric value among virtual links along a unique path to be an estimate for a metric value of the virtual link on the full-mesh virtual topology (1410); and C2) where the spanning tree is other than a maximum spanning tree, i.e., a minimum spanning tree, taking a maximum metric value among virtual links along a unique path to be an estimate for a metric value of the virtual link on the full-mesh virtual topology (1412).

Compared to the prior art that divides nodes into master nodes and subordinate nodes such that the master nodes maintain the network topology and carry out path computation on behalf of the subordinate nodes, the present invention provides the advantage of requiring little modification to existing routing protocols and architectures.

The present invention supports routing protocols that make use of link states, whereas in the prior art there are other methods that support routing protocols that make use of distance vectors. Aggregation of link states is more tractable than aggregation of distance vectors since the latter requires inter-subnetwork cooperation.

The present invention requires advertisement of order M pieces of link state information when the number of exposed nodes is M. Unlike the approach that advertises a full-mesh representation of the subnetwork topology, the invention does not suffer from link metric explosion. The estimated virtual topology proposed by the invention adequately reflects asymmetry in the original topology of the subnetwork.

While the prior art for routing to multiple destinations in a computer network tends to minimize the cost of communicating with multiple destinations, the present invention minimizes the number of link metrics to be advertised and estimates link metrics that are not advertised, thereby providing efficient routing.

The unique method of the present invention provides for representing link metric values on a full-mesh topology by a spanning tree topology and for estimating link metric values for links that are not part of the spanning tree, a capability that is particularly useful in link state aggregation for asynchronous transfer mode network implementations in an internetworking environment.

I claim:

1. A method for providing efficient aggregation of link metrics for a subnetwork in a communication network with an original subnetwork topology, comprising the steps of:

1A) selecting, by a predetermined subnetwork leader, a subset of nodes in the subnetwork to be exposed nodes, 1B) mapping, by the predetermined subnetwork leader, the original subnetwork topology, stored in a topology database of the subnetwork leader, to a full-mesh virtual topology wherein each virtual link connecting a pair of exposed nodes on the full-mesh virtual topology is derived utilizing a predetermined oath selection optimization, 1C) for each link metric that characterizes a preselected plurality of information transfer of links in the subnetwork, generating, by the subnetwork leader, a spanning tree virtual topology connecting the exposed nodes, 1D) determining link metric values to the virtual links on the spanning tree and advertising the metric values in a topology broadcast to nodes outside the subnetwork, by the subnetwork leader, and 1E) estimating for each link metric, by nodes outside the subnetwork, link metric values for all virtual links on the full-mesh virtual topology connecting the exposed nodes based on the link metric values for the virtual links on a corresponding spanning tree, wherein a link metric value associated with each virtual link on the full-mesh virtual topology is an estimate of a link metric value associated with a corresponding virtual link in the original subnetwork topology.

2. The method of claim 1 wherein the path selection optimization is one of: bandwidth maximization and delay minimization, where bandwidth and delay are link metrics.

3. The method of claim 2 wherein:

4A) link metrics are aggregated for bandwidth maximization utilizing a Maximum Bandwidth Link Metric Aggregation Heuristic, and link metrics are aggregated for delay minimization utilizing a Minimum Delay Heuristic, and 4B) where link metrics are aggregated for maximizing bandwidth, a Maximum Spanning Tree algorithm is utilized to determine a spanning tree with a maximum sum of link weights, and where link metrics are aggregated for bandwidth minimization, a Minimum Spanning Tree algorithm is utilized to determine a spanning tree with a minimum sum of link weights.

4. The method of claim 3 wherein link metrics are aggregated for bandwidth maximization utilizing the Maximum Bandwidth Link Metric Aggregation Heuristic that includes the steps of:

5A) determining a maximum bandwidth path for each pair of exposed nodes in the original subnetwork topology and representing each maximum bandwidth path by a virtual link whose link metric values equal respective link metric values of the maximum bandwidth path and wherein a collection of all virtual links constitutes the full-mesh virtual topology, 5B) determining, from the full-mesh virtual topology, a Minimum Bandwidth Spanning Tree using a Minimum Spanning Tree algorithm and bandwidth as link weights and distributing the bandwidth of the virtual links in the resulting spanning tree to the nodes outside the subnetwork; and 5C) determining, from the full-mesh virtual topology, a Maximum Delay Spanning Tree using a Maximum Spanning Tree algorithm and delay as link weights and distributing the delay of the virtual links in the resulting spanning tree to the nodes outside the subnetwork.

5. The method of claim 4 wherein the bandwidth of a non-spanning tree virtual link on the Maximum Bandwidth Spanning Tree that is unselected by the Maximum Spanning Tree algorithm in step 5B is estimated by determining the minimum bandwidth among the virtual links along a unique path that forms a loop on the spanning tree with the virtual link.

6. The method of claim 4 wherein the delay of a non-spanning tree virtual link on the Maximum Delay Spanning Tree that is unselected by the Maximum Spanning Tree algorithm in step 5C is estimated by determining a minimum delay among the virtual links along a unique path that forms a loop on the spanning tree with the virtual link, wherein the minimum delay is an estimate of an upper bound on the delay of the maximum bandwidth path or a corresponding virtual link in the full-mesh virtual topology.

7. The method of claim 4 wherein link metrics are aggregated for delay minimization utilizing the Minimum Delay Link Metric Aggregation Heuristic that includes the steps of:

10A) determining a minimum delay path for each pair of exposed nodes in the original subnetwork topology and representing each minimum delay path by a virtual link whose link metric values are equal to the respective link metric values of the minimum delay path and wherein a collection of all the virtual links forms a full-mesh virtual topology, 10B) determining, from the full-mesh virtual topology, a Minimum Bandwidth Spanning Tree using a Minimum Spanning Tree algorithm and bandwidth as link weights and distributing the bandwidths of the virtual links in the resulting spanning tree to nodes outside the subnetwork, and 10C) determining, from the full-mesh virtual topology, a Maximum Delay Spanning Tree using a Maximum Spanning Tree algorithm and delay as link weights and distributing the delay of the virtual links in the resulting spanning tree to the nodes outside the subnetwork.

8. The method of claim 7 wherein the bandwidth of a non-spanning tree virtual link on the Minimum Bandwidth Spanning Tree that is unselected by the Minimum Spanning Tree algorithm in Step 10B is estimated by determining the maximum bandwidth along a unique path that forms a loop on the spanning tree with the virtual link, an estimate that serves as a lower bound on the bandwidth of the minimum delay path or a corresponding virtual link in the full-mesh virtual topology.

9. The method of claim 7 wherein the delay of a non-spanning tree virtual link on the Maximum Delay Spanning Tree that is unselected by the Maximum Spanning Tree algorithm in step 10C is estimated by determining the minimum delay among the virtual links along a unique path that forms a loop on the spanning tree with the virtual link, an estimate that serves as an upper bound on the delay of the minimum delay path or a corresponding virtual link in the full-mesh virtual topology.

10. The method of claim 1 wherein advertising the metric values provides advertised link metric values that include a number of predetermined specific link metric values for replacing selected estimates derived from each spanning tree in step 1E.

11. The method of claim 1 wherein the link metric values associated with each link are, as selected, one of: symmetrical and asymmetrical in both directions of the link.

12. The method of claim 11 wherein link metrics for the subnetwork include at least one of bandwidth and delay, and the following approximations are made:

17A) if bandwidth is a link metric, the bandwidth associated with a link is the minimum bandwidth between both directions of the link, and 17B) if delay is a link metric, the delay associated with a link is the maximum delay between both directions of the link.

13. The method of claim 12 wherein a bandwidth associated with a link is a minimum bandwidth between both directions of the link, and an estimate for a link metric bandwidth is a lower bound, the estimate for bandwidth is a lower bound on bandwidth for both directions.

14. The method of claim 12 wherein a delay associated with a link is the maximum delay between both directions of the link, and an estimate for a link metric delay is an upper bound, the estimate for delay is the upper bound on delay for both directions.

15. The method of claim 1 wherein advertising the link metric values in a topology update includes advertisement of order M pieces of link state information when the number of exposed nodes is M, where M is a positive integer that is less than or equal to the total number of nodes in the original subnetwork topology.

16. The method of claim 1 wherein determining link metric values for the virtual links includes, for a given link metric, selecting a virtual link, on the full-mesh virtual topology, whose metric value is to be estimated from the corresponding spanning tree utilizing the steps of:

A) determining whether the virtual link is on the spanning tree,

B) where the virtual link is on the spanning tree, a metric value of the virtual link on the spanning tree is taken to be an estimate for the metric value of the corresponding virtual link on the full-mesh virtual topology, C) where the virtual link is absent from the spanning tree, determining a unique path connecting the exposed nodes attached at ends of the virtual link, and determining whether the spanning tree is a maximum spanning tree, C1) where the spanning tree is a maximum spanning tree, taking a minimum metric value among virtual links along a unique path to be an estimate for a metric value of the virtual link on the full-mesh virtual topology, and C2) where the spanning tree is other than a maximum spanning tree (i.e., a minimum spanning tree), taking a maximum metric value among virtual links along a unique path to be an estimate for a metric value of the virtual link on the full-mesh virtual topology.

17. A method for providing efficient aggregation of link metrics, including bandwidth and delay, for a subnetwork in a communication network having a plurality of interconnected subnetworks that consist of nodes and links, comprising the steps of:

A) selecting a subset of the nodes in a subnetwork of the communication network to be exposed nodes, B) mapping the original subnetwork topology to a full-mesh virtual topology such that each virtual link connecting a pair of exposed nodes on the full-mesh virtual topology is derived utilizing at least one of:

B1) determining a maximum bandwidth path connecting each pair of exposed nodes in the original subnetwork topology and representing each maximum bandwidth path by a virtual link whose link metric values equal respective metric values of the maximum bandwidth path and wherein a collection of all virtual links constitutes the full-mesh virtual topology, B2) determining a minimum delay path connecting each pair of exposed nodes in the original subnetwork topology and representing each minimum delay path by a virtual link whose link metric values equal respective metric values of the minimum delay path and wherein a collection of all virtual links constitutes the full-mesh topology;

C) where the full-mesh virtual topology is determined with the maximum bandwidth objective, further utilizing the steps of:

C1) determining an encoding for bandwidth metrics associated with the full mesh virtual topology, and advertising encoded bandwidth metrics by means of:

C1a) determining, from the full-mesh virtual topology, a Maximum Bandwidth Spanning Tree using a Maximum Spanning Tree algorithm and bandwidth as link weights, and C1b) distributing the bandwidth of the virtual links in the Maximum Bandwidth Spanning Tree to nodes outside the subnetwork; and C2) determining an encoding for delay metrics associated with the full-mesh virtual topology, and advertising encoded delay metrics by means of:

C2a) determining, from the full-mesh topology, a Maximum Delay Spanning Tree using a Maximum Spanning Tree algorithm and delay as link weights, and C2b) distributing the delay of the virtual links in the Maximum Delay Spanning Tree to nodes outside the subnetwork;

D) where the full-mesh virtual topology is determined with the minimum delay objective, further utilizing the steps of:

D1) determining an encoding for the bandwidth metrics associated with the full-mesh virtual topology, and advertising encoded bandwidth metrics by means of:

D1a) determining, from the full-mesh virtual topology, a Minimum Bandwidth Spanning Tree using a Minimum Spanning Tree algorithm and bandwidth as link weights, and D1b) distributing the bandwidths of the virtual links in the Minimum Bandwidth Spanning Tree to nodes outside the network; and D2) determining an encoding for delay metrics associated with the full-mesh virtual topology, and advertising encoded delay metrics by means of:

D2a) determining, from the full-mesh virtual topology, a Maximum Delay Spanning Tree using a Maximum Spanning Tree algorithm and delay as link weights, and D2b) distributing the delay of the virtual links in the Maximum Delay Spanning Tree to nodes outside the subnetwork.

18. The method of claim 17 wherein advertising the link metric values in a topology update includes advertisement of order M pieces of link state information when the number of exposed nodes is M, where M is a positive integer that is less than or equal to the total number of nodes in the original subnetwork topology.

* * * * *